(12) United States Patent
Cook et al.

(10) Patent No.: US 7,730,772 B2
(45) Date of Patent: Jun. 8, 2010

(54) SURFACE ACOUSTIC WAVE SENSOR AND PACKAGE

(75) Inventors: James D. Cook, Freeport, IL (US);
Brian J. Marsh, Freeport, IL (US);
Mohammed A J Qasimi, Freeport, IL (US); Daniel Dixon, Cedarville, IL (US);
Sachin Kumar, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 131 days.

(21) Appl. No.: 11/966,076

(22) Filed: Dec. 28, 2007

(65) Prior Publication Data

US 2009/0165546 A1 Jul. 2, 2009

(51) Int. Cl.
*B60C 23/02* (2006.01)
*G01L 9/00* (2006.01)

(52) U.S. Cl. .......................... 73/146.5; 73/700; 73/717; 73/753

(58) Field of Classification Search ........................ None
See application file for complete search history.

(56) References Cited

U.S. PATENT DOCUMENTS

| | | | |
|---|---|---|---|
| 4,100,811 A | 7/1978 | Cullen et al. | |
| 4,295,102 A | 10/1981 | Schmidt et al. | |
| 4,332,342 A | 6/1982 | Gilden et al. | |
| 4,598,587 A | 7/1986 | Dwyer et al. | |
| 4,621,530 A | 11/1986 | Dwyer et al. | |
| 5,821,425 A * | 10/1998 | Mariani et al. | 73/703 |
| 6,003,378 A | 12/1999 | Scherr et al. | |
| 6,335,667 B1 | 1/2002 | Takagi et al. | |
| 6,553,836 B2 | 4/2003 | Williams | |
| 6,758,089 B2 | 7/2004 | Breed et al. | |
| 7,082,835 B2 | 8/2006 | Cook et al. | |

(Continued)

FOREIGN PATENT DOCUMENTS

DE 10215834 11/2003

(Continued)

OTHER PUBLICATIONS

Benes et al., "Comparison between BAW and SAW Sensor Principles," IEEE International Frequency Control Symposium, pp. 5-20, 1997.

(Continued)

*Primary Examiner*—Lisa M Caputo
*Assistant Examiner*—Jermaine Jenkins

(57) ABSTRACT

A wireless and batteryless pressure sensor apparatus comprises of a SAW sensor and an antenna mounted on a printed circuit board. Optionally, and RFID tag in used in combination with the SAW sensor. A sensor antenna and a RFID antenna can be located on the printed circuit board such that the antennas communicate electrically with the sensor and the RFID device. The sensor can be interrogated utilizing a radio frequency, which is used to excite a SAW crystal inside the sensor. The interrogation signal causes the SAW to resonate wherein a resonant frequency changes with the pressure and temperature that is applied to the sensor. An interrogator can receive a return (echo) signal representing a change in SAW sensor properties (e.g., diaphragm change). A printed circuit board can be mounted on a stainless steel port and overpackaged with standard processes for hermetically sealing the sensor, or sensor and RFID device with at least one antenna.

20 Claims, 8 Drawing Sheets

U.S. PATENT DOCUMENTS

| | | | |
|---|---|---|---|
| 7,100,451 B2* | 9/2006 | Solie | 73/703 |
| 7,109,632 B2 | 9/2006 | van Knokke | |
| 7,129,828 B2* | 10/2006 | Cook | 340/447 |
| 7,165,298 B2 | 1/2007 | Ehlers et al. | |
| 7,243,547 B2 | 7/2007 | Cobianu et al. | |
| 2003/0005759 A1 | 1/2003 | Breed et al. | |
| 2005/0028595 A1* | 2/2005 | Pfeifer et al. | 73/715 |
| 2005/0151599 A1* | 7/2005 | Ido et al. | 333/133 |
| 2006/0179918 A1 | 8/2006 | Liu | |
| 2006/0238078 A1 | 10/2006 | Liu | |
| 2008/0265711 A1 | 10/2008 | Kumar et al. | |

FOREIGN PATENT DOCUMENTS

| | | |
|---|---|---|
| WO | 0220287 | 3/2002 |
| WO | 0231461 | 4/2002 |
| WO | 03078950 | 9/2003 |
| WO | 03081195 | 10/2003 |

OTHER PUBLICATIONS

Buff, et al., "Passive remote Sensing for Temperature and Pressure Using SAW Resonator Devices," IEEE Transactions on Ultrasonics, Ferroelectrics, and Frequency Control, vol. 45, No. 5, pp. 1388-1392, Sep. 1998.

Reindl, et al., "Theory and Application of Passive SAW Radio Transponders as Sensors," IEEE Transactions on Ultrasonics, Ferroelectrics, and Frequency Control, vol. 45, No. 5, pp. 1281-1292, Sep. 1998.

Scherr et al., "Quartz Pressure Sensor Based on SAW Reflective Delay Line," IEEE Ultrasonics Symposium, pp. 347-350, 1996.

Schimetta et al., "Optimized Design and Fabrication of a Wireless Pressure and Temperature Sensor Unit Based on SAW Transponder Technology," IEEE MTT-S International Microwave Symposium Digest, pp. 355-358, 2001.

Reindl et al., "SAW Devices as Wireless Passive Sensors," IEEE Ultrasonics Symposium, pp. 363-367, 1996.

Scholl et al., "Wireless Passive SAW Sensor Systems for Industrial and Domestic Applications," IEEE International Frequency Control Symposium, pp. 595-601, 1998.

Tiersten, et al., "An Analysis of the Normal Acceleration Sensitivity of ST-Cut Quartz Surface Wave Resonators Rigidly Supported Along the Edges," 41st Annual Frequency Control Symposium, pp. 282-288, 1987.

* cited by examiner

SURFACE ACOUSTIC WAVE SENSOR AND PACKAGE

TECHNICAL FIELD

Embodiments are generally related to sensors, and in particular pressure and temperature sensors and systems. Embodiments are also related to surface acoustic wave (SAW) devices and, more particularly, to a pressure and/or temperature sensor assembled as a self-contained batteryless, transmitterless system. Embodiments are additionally related to wireless and batteryless pressure and/or temperature sensors used in mobile and industrial applications.

BACKGROUND OF THE INVENTION

Surface acoustic wave (SAW) devices used as sensors in measurement system are known, For example, a tire pressure monitoring system (TPMS) helps to avoid accidents by warning the driver about tire pressure problems. TPMS is a vehicle-embedded system detecting the tire pressure by analyzing the difference between the wheel speeds or by measurement of pressure and temperature. System like a direct TPMS system typically consists of one UHF receiver in the vehicle and four sensors mounted on the wheel rim or valve to sense data, to calibrate pressure versus temperature and to organize data transmission to the car body.

Various other SAW sensor applications are known in the art. In particular, many different techniques have been proposed for sensing the temperature of a component in an industrial process or system. Pressure, as with use in tires and for delivering this information to the operator at a central location on the vehicle, can be used in industrial system to convey pressure differentials during processing operations (e.g., dairy, petroleum, medical, aeronautical, deep sea, etc., applications).

The majority of prior art sensors are direct active systems, some utilizing a silicon micro-electro-mechanical system (MEMS) based sensor powered by a battery. Where several sensor are utilized throughout a target system, pressure and temperature information is transmitted by radio from each sensor locations (e.g., each of the wheels on a motor vehicle) to an electronic control unit (ECU) and displayed as either a number or a warning indicator. The problem associated with using such prior art systems in, for example, a TPMS environment is that the need to remove the tire for access to the batteries, and the need to rebalance the tires after battery replacement, together with the disposal of worn out batteries are the major shortcomings of direct sensing systems. Batteries inside tires add weight, have limited life and cannot be replaced. Furthermore, they require some sort of electrical connection between the sensor and any remote monitoring device. With a rotating wheel, this electrical connection requires special contacts, complicating the system, introducing added cost and reducing reliability.

Conventional wireless systems are not durable and are expensive to design and produce. The sensors and transmitters must also be able to withstand the harsh environment, such as when used inside a vehicle tire that includes high temperatures, shock and vibration, and centrifugal forces from tire rotation. Although it has the advantage of wireless communication of the pressure to a remotely placed monitor, it is difficult to install and service, and requires special adaption of the wheel.

One particular type of sensor, or condition-responsive device, which has recently become desirable for use in certain electronics systems, is an acoustic wave device, such as a surface acoustic wave (SAW) device. SAW devices have desirable properties for certain sensor applications since they are sensitive, use very little power, and can be operated at radio frequencies convenient for relaying information in a wireless fashion. SAW devices may include at least one resonator element made up of interdigitated electrodes deposited on a piezoelectric substrate. One of the problems with current SAW sensor designs, particularly those designs adapted to tire pressure and temperature sensing applications, is the inability of conventional SAW sensing systems to meet the rigorous environment within the environment itself. Such systems are inherently expensive, awkward, and often are not reliable in accurately sensing at least one of tire air pressure and temperature.

A need therefore exists for an improved wireless and batteryless SAW sensor apparatus and packaging system, which for example can be integrated into a tire and interrogated wirelessly, and that the sensors are ultimately more efficient and sturdier than presently implemented sensors. Such an apparatus is described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved sensor methods and systems.

It is another aspect of the present invention to provide for improved wireless, batteryless and transmitterless SAW pressure sensor with housing options.

The aforementioned aspects and other objectives and advantages can now be achieved as described herein. A wireless and batteryless pressure sensor apparatus comprises of a SAW sensor and a sensor antenna. The SAW sensor alone in combination with a sensor antenna can adequately operate at short distances from an interrogator, i.e., less than 30 inches. SAW devices are resonator whose resonant frequency changes when strained. Working at radio frequencies, SAW sensing devices can be wirelessly excited with an interrogation pulse and a response (partial echo of the RF from the interrogator) from the SAW sensor can be measured to allow at least one of pressure and/or temperature to be calculated.

Optionally, an RFID device can be mounted on a printed circuit board with the SAW sensor. An RFID device can be added to the SAW sensor for a total wireless solution with read distances greater than 30 inches. A sensor antenna and an RFID antenna can be located on the printed circuit board such that the antennas communicate electrically with the sensor and the RFID device. As with the SAW sensor only solutions, the sensor can be interrogated utilizing a radio frequency, which can be used to excite a SAW crystal inside the sensor. The interrogation signal causes the SAW to resonate wherein the resonant frequency changes with the pressure and temperature that can be applied to the sensor. The sensor's resonation frequency/signal is then transmitted by the RFID tag.

The printed circuit board can be mounted on a stainless steel port and overpackaged with standard processes for hermetically sealing the sensor, the sensor combined with an RFID device.

Antennas are capable of receiving a radio frequency signal. When the antenna receives the particular signal associated with the sensor, or sensor +RFID device, the measurement generated by the sensor can be directed to and transmitted by the sensor antenna.

A SAW sensor can be designed in a button package which result in a full line of sensors for use with harsh media. The sensor can be used in a wide variety of pressure ranges, port styles, and termination types.

A sensor as will be further described herein can be adapted for use as a pressure and/or temperature sensing product for broad use in industrial, commercial, petroleum and automotive markets (e.g., TPMS). In a TPMS application, the sensor housing can be integrated with the valve stem inside the tire, strapped on the rim inside the tire, or mounted to the rim outside the tire. Such a sensor can also be utilized for moving automotive parts such as tires, wheels, suspensions, rotary pumps, pistons, valves, and other pressure tanks or vessels. The SAW pressure sensor apparatus disclosed herein can therefore sense pressure and temperature for use in harsh media and is resistant to the effects of shock, vibration and hostile environments.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

Figure 3:
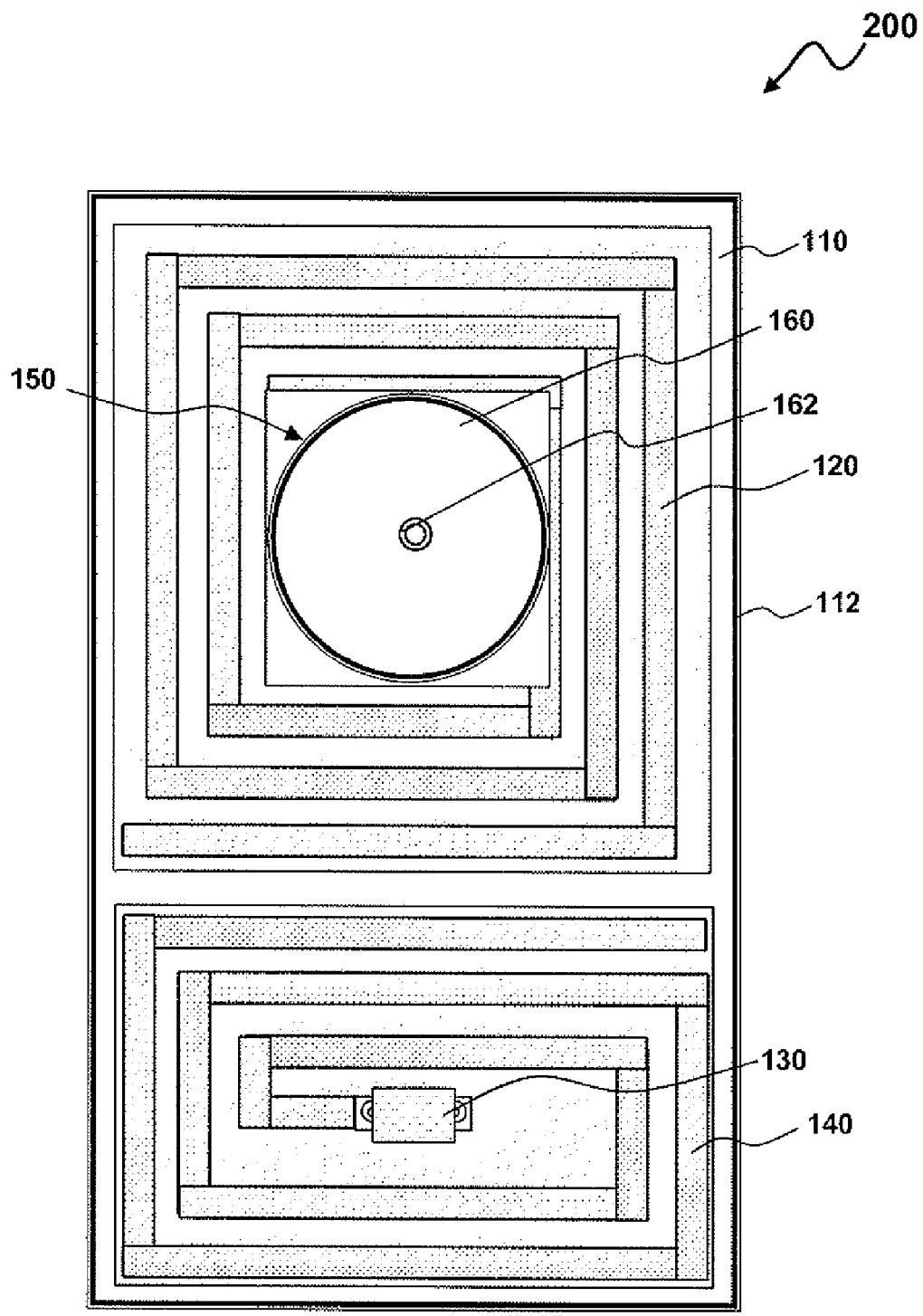
FIG. 3 illustrates an exploded view of a sensor antenna assembly including a SAW sensor and RFID tag, which can be implemented in accordance with a alternative embodiment.
Figure 5:
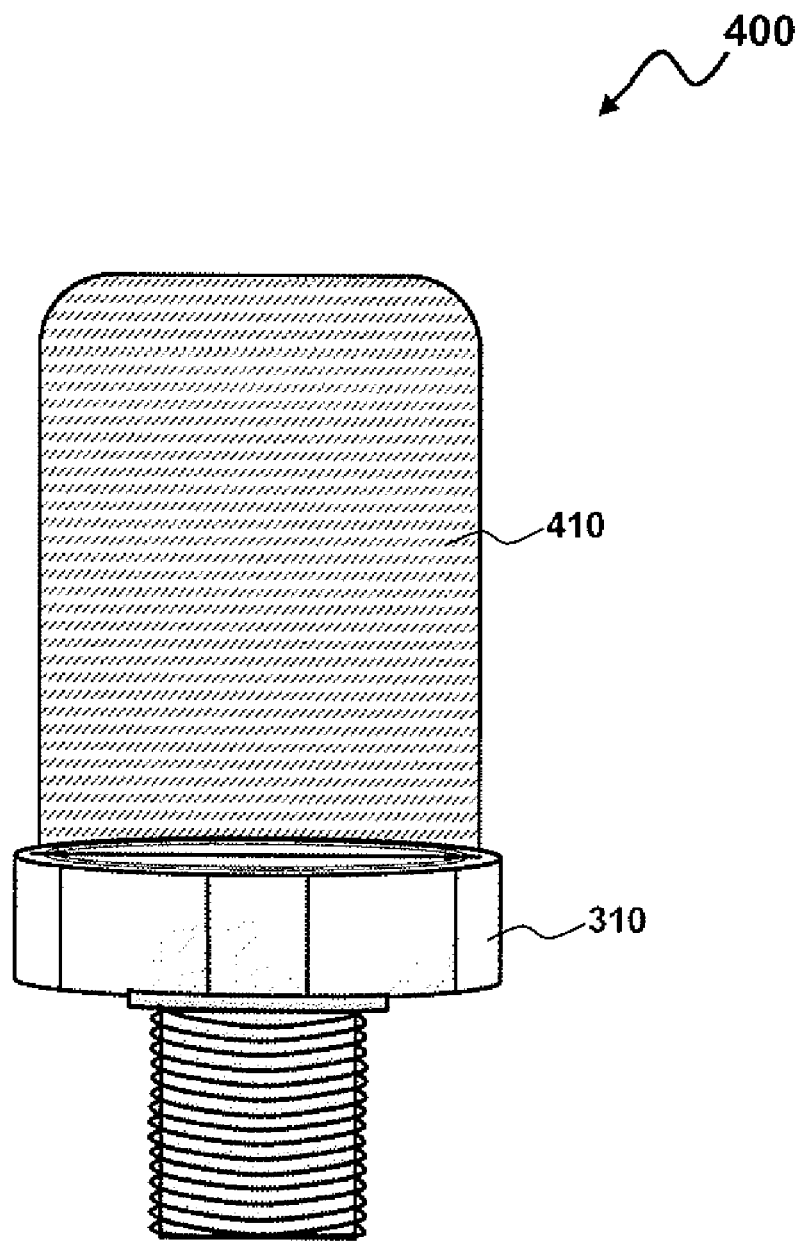
Figure 6:
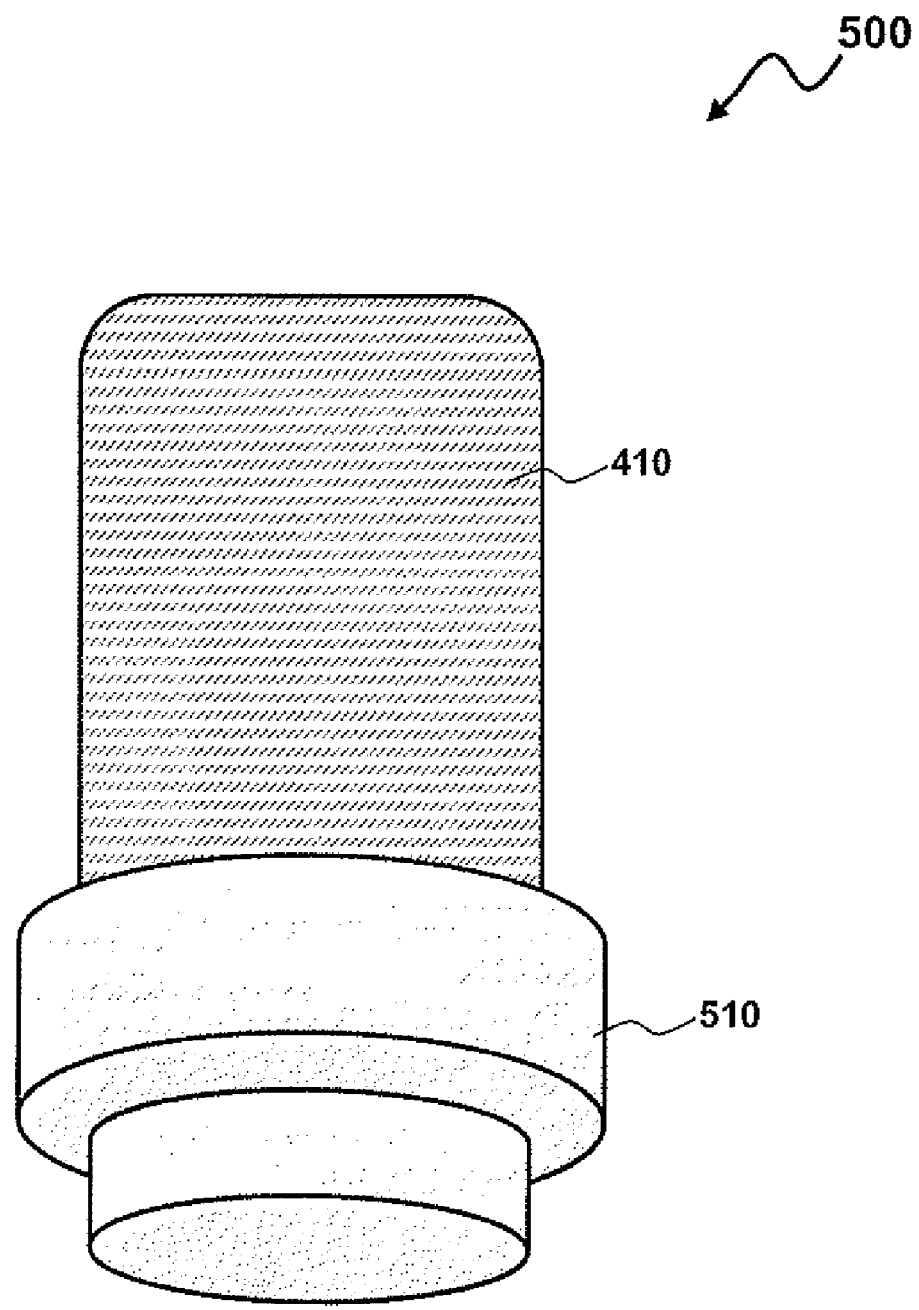
Figure 7:
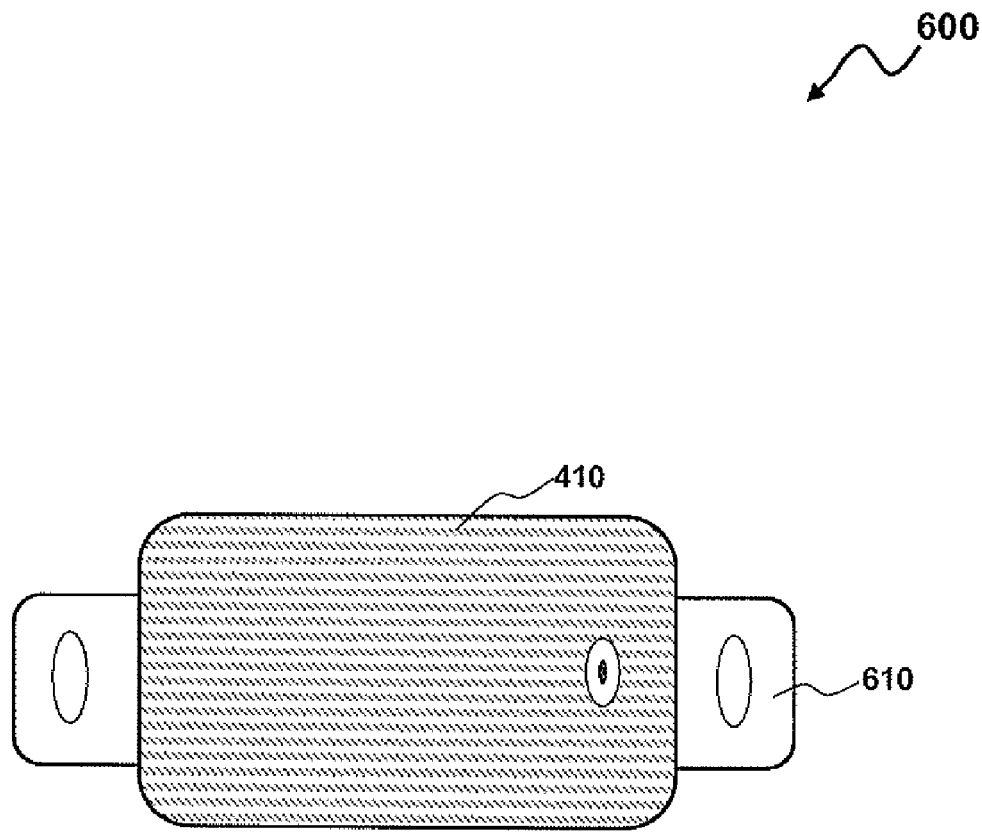
Figure 8:
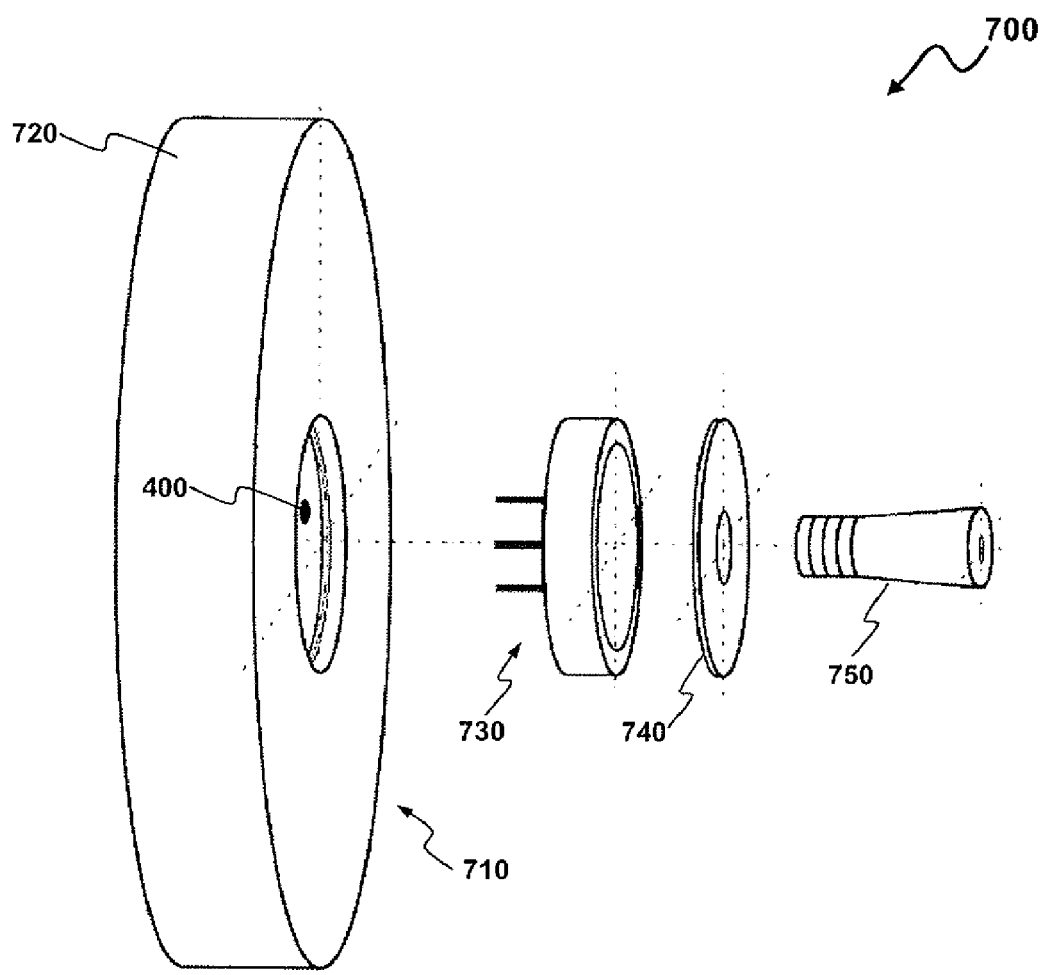

FIG; 4 illustrates a perspective view of the sensor antenna assembly of FIG. 3 mounted on a stainless steel port, in accordance with an alternative embodiment;

FIG. 5 illustrates a perspective view of a packaged pressure sensor apparatus, in accordance with a preferred embodiment;

FIG. 6 illustrates a perspective view of the pressure sensor apparatus with flush mount port, in accordance with an alternative embodiment;

FIG. 7 illustrates a perspective view of a strap pressure sensor apparatus, in accordance with an alternative embodiment; and FIG. 8 illustrates an exploded view of a tire sensor system, which can be implemented in accordance with an alternative embodiment of the present invention.

DETAILED DESCRIPTION OF THE EMBODIMENTS

The particular values, configurations and applications discussed in these non-limiting examples can be varied and are cited merely to illustrate at least one embodiment and are not intended to limit the scope thereof. Note that in FIGS. 1-8 identical parts or elements are generally indicated by identical reference numerals.

Figure 1A:
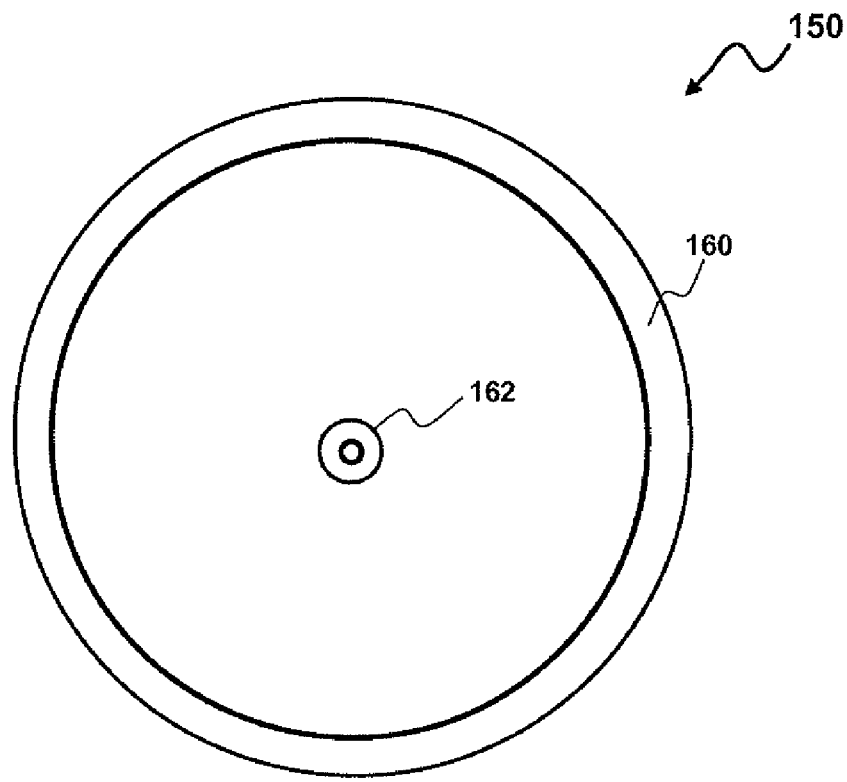
FIG. 1A illustrates a top view of a SAW sensor button package, which can be implemented in accordance with a preferred embodiment.

Referring to FIG. 1A a top view of a SAW sensor button package 150 is illustrated, which can be implemented in accordance with a preferred embodiment. Pressure sensor package 150 generally includes a package cover 160 that includes a dimple 162 formed at the center of cover 160. Pressure sensor package 150 can be implemented as a SAW pressure and/or temperature sensor.

Figure 1B:
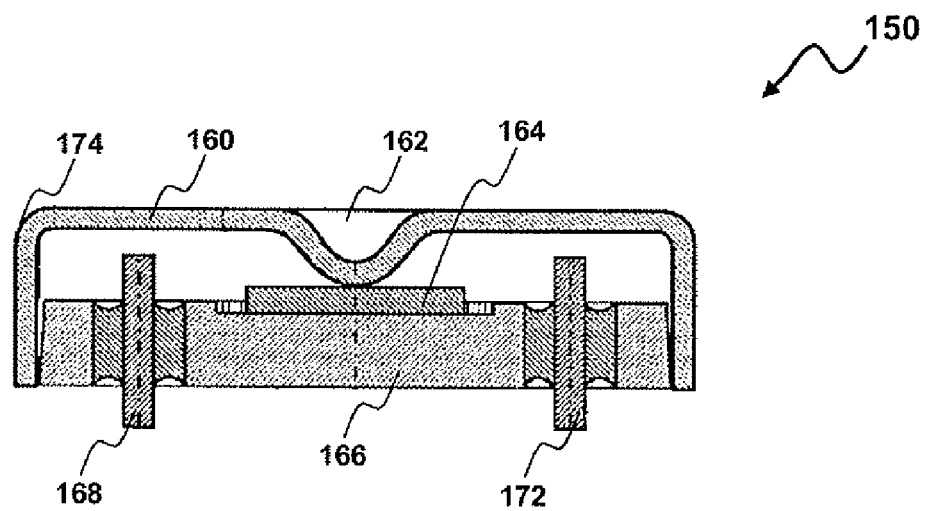
FIG. 1B illustrates a side view of the SAW sensor button package, which can be implemented in accordance with a preferred embodiment.

Referring to FIG. 1B a side view of the SAW sensor button package 150 is illustrated, which can be implemented in accordance with a preferred embodiment. Cover 160 thus generally includes a dimple 162 formed at the center of cover 160. A quartz sense element 164 can be located below proximate to dimple 162 and between mounting pins 168 and 172. Pressure sensor 150 can be implemented as a SAW pressure sensor that includes a quartz sense element 164 (e.g., a SAW chip), and a package base 166. The sensor diaphragm 174 can be hermetically welded to the front end of the sensing element 164. The pressure sensor 150 described herein can be utilized to measure pressure and temperature inside monitored systems, such as a vehicle tire (e.g., a passenger car tire or truck tire). When used as A TPMS, the pressure sensor 150 should preferably possess a low cross sectional area and thickness, and be generally lightweight in configuration to be compatible for application within truck tires and passenger car tires.

Figure 2:
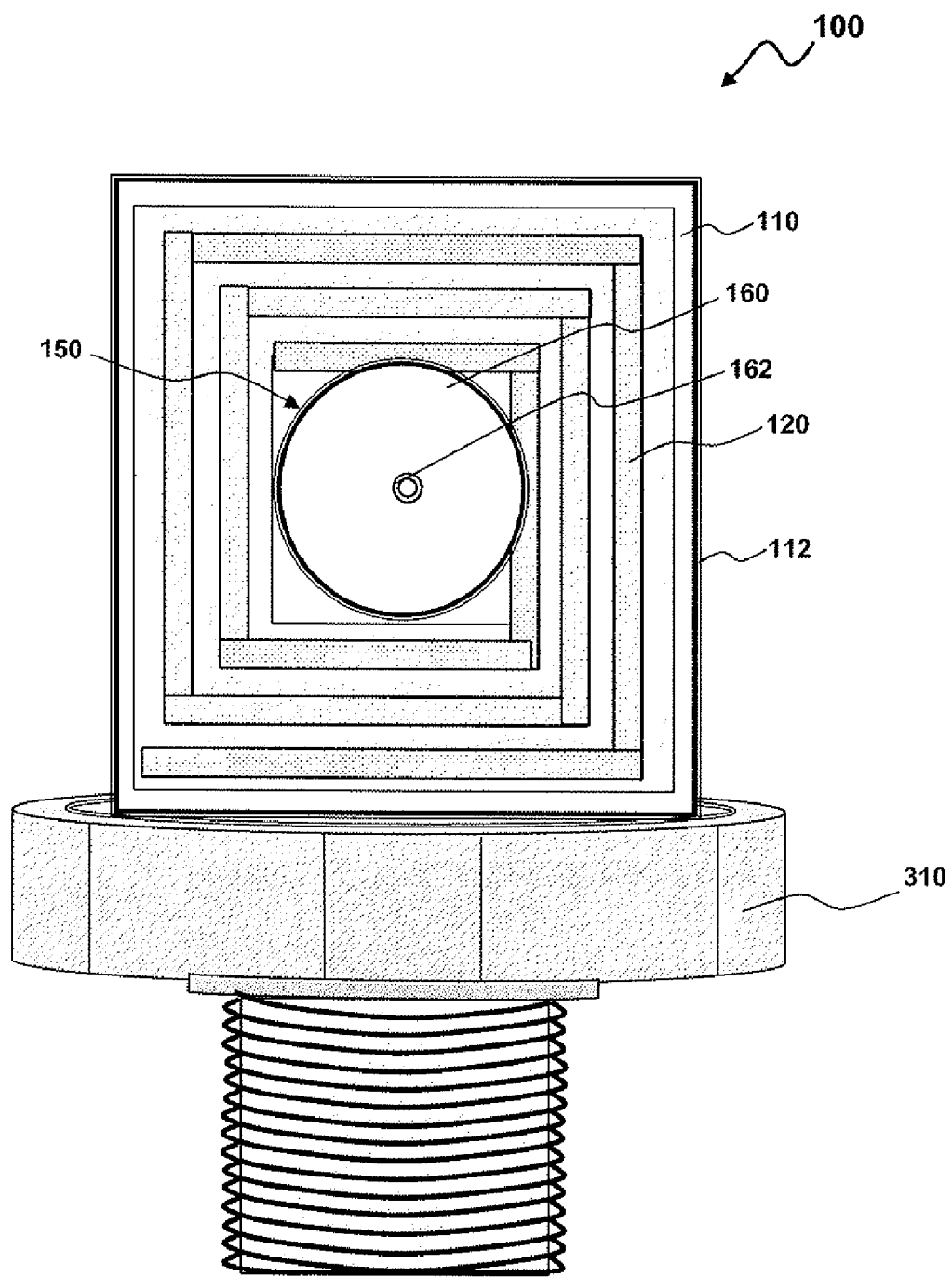
FIG. 2 illustrates a perspective view of the sensor antenna assembly mounted on a stainless steel port, in accordance with a preferred embodiment embodiment.

Referring to FIG. 2 an exploded view of a SAW sensor system 100 in accordance with a preferred embodiment of the invention. The sensor system 100 can include a substrate 112 associated with a flexible printed circuit board 110 that can be formed from a high-performance polyimide film material that is currently available and utilized in the electronics arts such as, for example, Kapton®. Kapton® is a registered trademark of the E. I. DuPont de Nemours and Company. The SAW sensor system as depicted includes a SAW sensor 150 and sensor antenna assembly 120 as illustrated, and which can be implemented in accordance with a preferred embodiment of the present invention. The SAW sensor 150 is combined with an antenna 120 on the flexible printed circuit board 110 and assembled in a stainless steel port package 310 for use in various applications. The sensor and antenna portions can then be overmolded to protect them from debris, as will be described in more detail below.

Referring to FIG. 3 an exploded view of a SAW sensor system 200 is illustrated, which can be implemented in accordance with an alternative embodiment of the present invention. Sensor package 150 described in FIG. 2 can be modified for use with radio-frequency identification (RFID) device 130. The sensor antenna assembly 100 can therefore function as a combined SAW sensor 150 and RFID sensor 130 that permits proximity-based communications between a reader and multiple transponders. Radio frequency identification device (RFID) 130 can be utilized to provide unique identification for a given tire, enabling tracking abilities for a tire. The sensor system 100 can include a substrate 112, a flexible printed circuit board 110 that can be formed from a high-performance polyimide film material that is currently available and utilized in the electronics arts such as, Kapton®. The assembly 100 can also includes a surface acoustic wave (SAW) sensor 150 and sensor antenna 120 and an RFID 130 and RFID antenna 140, which can be electronically connected. The SAW sensor antenna 120 and the RFID antenna 140 can be a shared antenna and enable communication or electrical connection between the SAW sensor package 150 and the RFID device 130. The SAW sensor package 150 can be configured from one or more SAW sensing elements. Such a configuration therefore permits wireless interrogation of SAW sensor package 150 from an external wireless source, such as, for example, a wireless data transmitter and receiver device (e.g., interrogator), which is located external to the sensor assembly 100.

Antennas 120 and 140 can be printed on a polyimide substrate 112 such as, for example, Kapton®. Antennas 120 and 140 can therefore constitute flexible circuit antenna configurations and/or antenna ribbons. Antennas 120 and 140 can be printed onto a substrate 112 (or tape) formed from a polyimide film material such as, for example, Kapton®. It can be appreciated that other types of polyimide films can be utilized in place of Kapton® in accordance with alternative embodiments. The use of Kapton® is therefore discussed herein for general illustrative and edification purposes only and is not considered a limiting feature of the embodiments disclosed herein.

As utilized herein with respect to the invention, the term "RFID device," and so forth generally can refer to a device that includes a loop antenna of one or more turns coupled to an electronic device, wherein the electronic device both receives signals via the loop antenna and transmits signals via the loop antenna. Specific measurement parameters can also be extracted from certain SAW RFID configurations to produce a passive wireless sensor capable of conveying an identification code if required along with temperature, pressure or other similar measurements back to an interrogation reader. Such uniquely identifiable sensors can be well suited for the automotive industry where a single reader located in an automobile could communicate and monitor pressure, temperature and other useful parameters.

The received signals with respect to the wireless article may include signals for controlling and/or operating the electronic device and/or for being stored in a memory associated therewith, whether embodied in the same or a separate electronic chip. The transmitted signals with respect to the wireless article may include information that is stored in the memory of or associated with the electronic device and may include information previously received and stored therein.

Such device or other wireless article may be part of the object to be detected/identified, or may be made on a rigid or flexible substrate that is placed with and/or attached to such object, such as by adhesive or a strap or tie or the like, or by being packaged therewith, either permanently or releasable, as may be desired for a particular application. Where the object is metallic or otherwise electrically conductive the wireless article can be spaced away from the object a sufficient distance, e.g., a few millimeters, to allow operation of its antenna for communication of signals.

Figure 4:
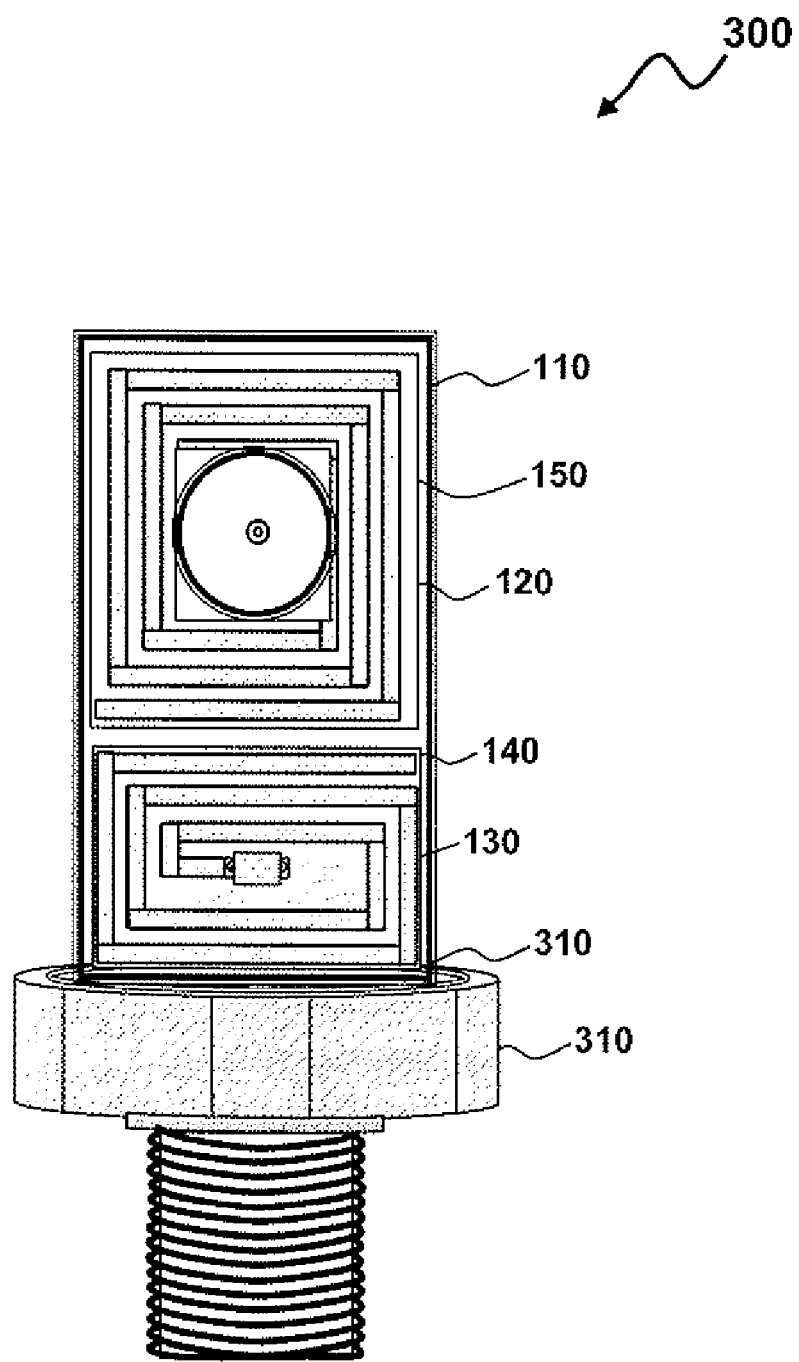

Referring to FIG. 4 a perspective view of the sensor antenna assembly 100 mounted on a stainless steel port 310 is illustrated, in accordance with an alternative embodiment. The sensor apparatus 300 includes the sensor antenna assembly 100 mounted on a stainless steel port 310, such as, for example, a stainless steel 17-7 PH material. The sense element 164 of the pressure sensor package 150 is bonded to the stainless steel port 310 in order to measure diaphragm deformations.

Referring to FIG. 5 a perspective view of the sensor package assembly 400 with plastic cover 410 is illustrated, in accordance with an alternative embodiment. The sensor assembly 100 can be overpackaged or overmolded with a plastic cover 410 once placed on the stainless steel port 310 for hermetically sealing the sensor package 150, and the RFID device 130 when included with the SAW sensor in the package 400. The plastic cover 410 can next be stamped into a circular shape, and deep drawn into a cup configuration. The dimensions of cover 410 may vary, depending on the needs and use of such a device. This SAW sensor package 150 can also be overpackaged by welded into a fitting, threaded port, or automotive style housing and can be utilized in food and beverage, dairy, kidney dialysis, infusion pumps, air compressors, hydraulic controls, transportation, aerospace, agriculture, oil refinery, refrigeration and general industrial applications.

The sensor apparatus 400 can be interrogated utilizing a radio frequency band of 434 MHz, which is the standard ISM (Industrial, Scientific and Medical) band. The cover 410 of the sensor assembly 100 acts as a diaphragm that applies a force to flex the SAW sensor 150, which changes the SAW frequency proportional to the applied pressure. A portion of the interrogation signal can be used to excite the SAW sense element 164 inside the sensor 150 as shown in FIG. 1B.

After the sensor element 164 reaches resonation, a resonant frequency can be transmitted to the user through the SAW sensor antenna 120. This resonant frequency changes with the pressure and temperature that is applied to the sensor apparatus 400. A change in the output signal from the SAW sensor 150, such as a change in frequency, phase and/or amplitude of the output signal, corresponds to changing characteristics in the propagation path of the SAW sensor apparatus 400. In some SAW device embodiments, monitoring device frequency and any changes thereto provide sufficient information to determine parameters such as temperature and strain to which a SAW device is subjected.

Referring to FIG. 6 a perspective view of a pressure sensor apparatus 500 with flush mount port 510 is illustrated, in accordance with an alternative embodiment. The plastic cover 410 acts as the flush mount diaphragm. The dimple 162 translates external pressure to mechanical force against the sense element 164. The flush mount port 510 is ideal for medical, beverage and food processing applications where stringent sanitation requirements are necessary. Note that flush mount port 510 can be configured from stainless steel.

Referring to FIG. 7 a perspective view of a strap sensor apparatus 600 is illustrated, in accordance with an alternative embodiment. The sensor antenna assembly 100 with top plastic cover 410 can be placed with and/or attached to a strap 610.

Referring to FIG. 8 an exploded view a tire sensor system 700 is illustrated, which can be implemented in accordance with an alternative embodiment of the present invention. System 700 can be implemented in the context of a tire 710 associated with, for example, a drum-type brake. It can be appreciated, however, that system 700 can be implemented in the context of other brake systems, such as disk brakes, and that the drum-type brake configuration is presented herein for general illustrative and edification purposes only. Tire 710 generally includes a tire rim 720. System 700 includes a brake drum 730, which can interact with a backing plate 740, which in turn surrounds a vehicle axle 750.

System 700 also incorporates sensor apparatus 400, 500 and 600, which is described in greater detail herein with respect to FIGS. 1-7. System 700 can be utilized to monitor the temperature and pressure of tire 710 by locating sensor apparatus 400, 500 and 600 at a particular location within or on tire 710. In general, sensor apparatus 400, 500 and 600 can be placed into tire 710 prior to tire molding thereof. Sensor apparatus 400, 500 and 600 can then be "cured into" tire 710. Sensor apparatus 400, 500 and 600 therefore measures air pressure and temperature inside tire 710. A wireless signal (e.g., radio frequency, low frequency, etc.) can be transmitted to sensor apparatus 400, 500 and 600. Pressure and air temperature data can then be transmitted back for further collection and evaluation.

The sensor antenna assembly 100/200 and the stainless steel port 310 can be utilized as a wireless and batteryless pressure and temperature sensor that can be used in a wide variety of applications. The sensor apparatus 400 utilizes surface acoustic wave (SAW) technology for the sensor technology and, when used, a passive radio frequency identification (RFID) technology for enhanced signal transmission. The key applications may be in Tire Pressure Monitoring Systems (TPMS) 700 where the sensor apparatus 400 can be integrated with the valve stem inside the tire 710, strapped on the rim 720 inside the tire 710 utilizing sensor apparatus 600, and mounted to the rim 720 outside the tire 710 utilizing sensor apparatus 500.

Each of the two antennas 120 and 140 can be wired to a respective BNC connector (not shown) that protrudes from the top of each antenna block. Note that the term "BNC Connector" as utilized herein generally refers to a type of connector utilized with coaxial cables. The basic BNC connector is a male type mounted at each end of a cable. This connector has a center pin connected to the center cable conductor and a metal tube connected to the outer cable shield. A rotating ring outside the tube locks the cable to any female connector.

The sensor apparatus such as apparatus 400, 500 and 600 is ideal for equipment that has moving parts such as tires, wheels, suspensions, rotary pumps, pistons, valves, and other pressure tanks or vessels. These sensors can be ideal for mobile, portable, or un-stationary equipment. The sensor apparatus can be interrogated with low power RF signals and can be ideal for applications that require intrinsically safe and explosion proof components. The sensor apparatus 400, 500 and 600 is resistant to the effects of shock, vibration and hostile environments. A wide variety of pressure ranges, port styles, and termination types can be utilized with respect to the sensor antenna assembly 100. The wireless technology allows the measurement of pressure and temperature from inside the tire 710 to help truck fleet managers accurately monitor tire pressure for improved fuel efficiency and extended tire life.

The invention described herein can be implemented, in accordance with one possible embodiment, as a product in a component in a wireless and batteryless tire pressure monitoring system (TPMS). Although described in detail as a possible application, TPMS should not be viewed as a limitation over the present invention as it will be appreciated that many other industrial and commercial applications are possible for the wireless, batteryless sensor described herein. Such an exemplary embodiment as TPMS can be configured as a small-size device, which is also lightweight and based on batteryless operation. The pressure sensor described herein does not consume power when implemented in the context of a TPMS operation. Thus, the present invention can be embodied in a practical and low cost design solution. Such a design can be mass-produced for automotive, heavy-duty vehicles, and commercial markets.

It will, therefore, be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A wireless and batteryless pressure sensor apparatus, comprising:
   a SAW pressure sensor for sensing an applied pressure of interest, the SAW pressure sensor receiving an interrogating radio frequency (RF) signal from a remote interrogation unit via a first antenna, wherein a resonant frequency of the SAW pressure sensor changes with the applied pressure;
   the first antenna provided on a printed circuit board and connected to said SAW pressure sensor;
   an RFID device;
   a second antenna connected to the RFID device, the second antenna also provided on a printed circuit board;
   a sensor package base having an input pressure port that is in fluid communication with the SAW sensor for exposing the SAW sensor to the applied pressure of interest; and
   a sensor package cover coupled to the sensor package base, the sensor package cover and the sensor package base together define a cavity that houses the SAW pressure sensor, the RFID device and the first and second antenna.

2. The apparatus of claim 1 wherein said SAW pressure sensor includes a SAW pressure sensing element sealed in a SAW pressure sensor package, wherein the SAW pressure sensing element comprises a surface acoustic wave sensing element for use in measuring at least one of pressure and temperature.

3. The apparatus of claim 2 wherein said SAW pressure sensor package is a button package that includes a dimple that engages and transfers force to the SAW pressure sensing element.

4. The apparatus of claim 1 wherein said sensor package base includes a stainless steel input pressure port.

5. The apparatus of claim 1 wherein the first antenna and the second antenna are provided on a common printed circuit board that is mounted in the cavity defined by the sensor package cover and the sensor package base.

6. The apparatus of claim 5 wherein said common printed circuit board is a flexible printed circuit board.

7. The apparatus of claim 6 wherein the first antenna and the second antenna are printed on the flexible printed circuit board, and wherein the RFID device is mounted on the flexible printed circuit board.

8. The apparatus of claim 1 wherein said sensor package base includes a stainless steel material, and said sensor package cover includes a plastic material.

9. The apparatus of claim 1 mounted and used with a tire, wherein the applied pressure corresponds to a tire pressure inside the tire.

10. The apparatus of claim 9 mounted inside of a rim of a tire.

11. A wireless and batteryless sensing apparatus, comprising:
    a printed circuit board;
    a Surface Acoustic Wave (SAW) sensor package including a SAW sensing element, said SAW sensor package mounted on said printed circuit board for receiving an interrogating radio frequency (RF) signal, wherein a resonant frequency of the SAW sensing element changes with at least one of pressure and temperature;
    an RFID device mounted on said printed circuit board with said SAW sensor package;
    at least one antenna electrically in communication with said SAW sensor element and/or said RFID device that permits wireless and batteryless interrogation by a remote transceiver;

a package base for mounting said printed circuit board; and a package cover coupled to the package base, wherein the package cover and the package base together define a cavity that houses the SAW sensor package, the RFID device, the printed circuit board and the at least one antenna.

12. The apparatus of claim 11 wherein said SAW sensor package comprises a sensor diaphragm.

13. The apparatus of claim 11 wherein said at least one antenna includes a first antenna for the SAW sensing element and a second antenna for the RFID device, and wherein the first antenna and the second antenna are provided on the printed circuit board.

14. The apparatus of claim 11 wherein said package cover comprises a plastic material.

15. The apparatus of claim 11 wherein said package base comprises a stainless steel input port.

16. The apparatus of claim 11 wherein said printed circuit board is a flexible printed circuit board.

17. A method for wirelessly sensing conditions, comprising:

providing a printed circuit board having a surface acoustic wave (SAW) sensor package including a SAW sensing element, the SAW sensor package configured for receiving an interrogating radio frequency (RF) signal wherein a resonant frequency of the SAW sensing element changes with an applied pressure and/or temperature;

providing at least one antenna electrically in communication with said SAW sensor element that permits wireless and batteryless interrogation by a remote transceiver; and providing a package base for mounting said printed circuit board and a package cover, wherein the package cover and the package base together define a cavity that houses the printed circuit board including the SAW sensor package, and the at least one antenna.

18. The method of claim 17, further comprising providing an RFID tag for use with said SAW sensing element, wherein said RFID tag and the SAW sensing element are each configured to provide a signal to the remote transceiver.

19. The method of claim 17 wherein said package base comprises a metal material, and said package cover comprises a plastic material.

20. The method of claim 17 wherein said printed circuit board is a flexible printed circuit board, and the at least one antenna is provided on the flexible printed circuit board.

* * * * *